UNITED STATES PATENT OFFICE 2,108,299

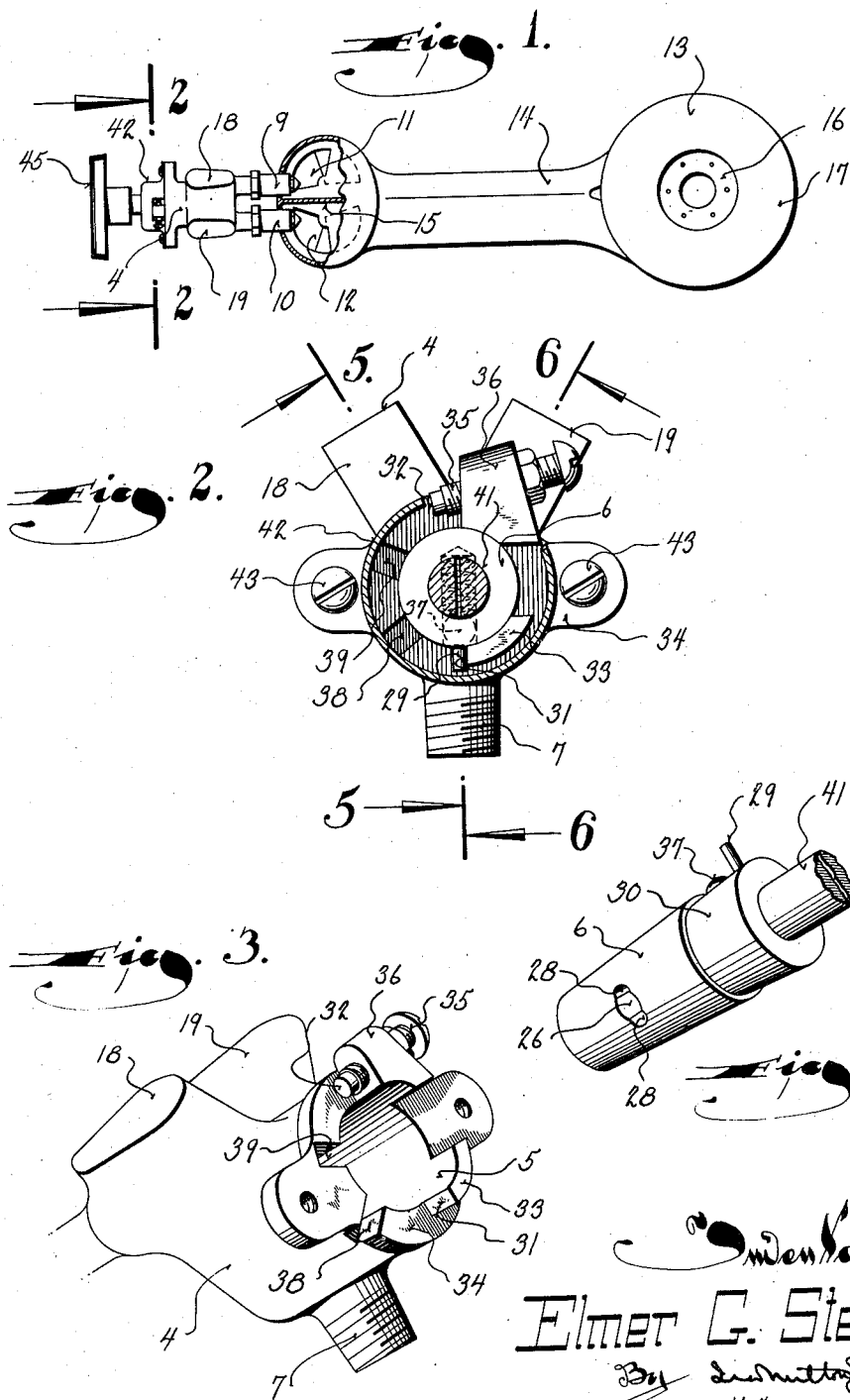

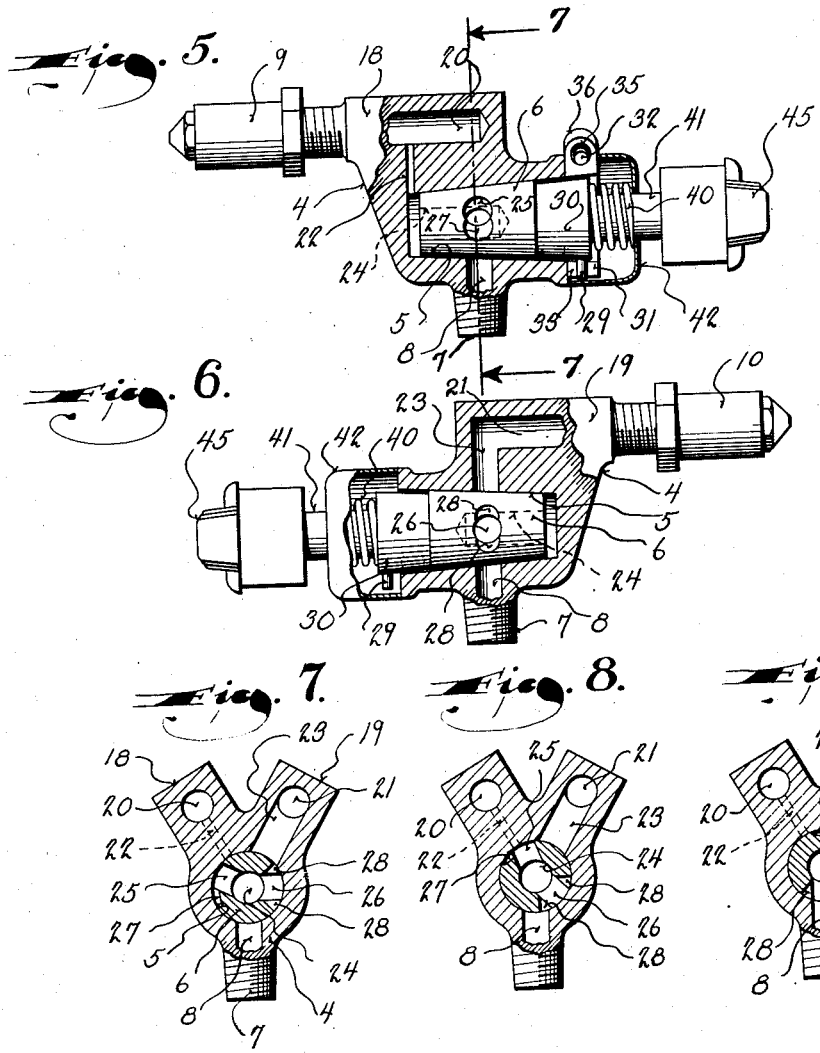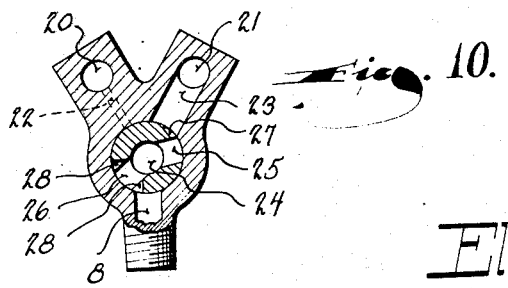

GAS COCK

Elmer G. Steffen, Cleveland Heights, Ohio, assignor to Milwaukee Gas Specialty Company, Milwaukee, Wis., a corporation of Wisconsin Application March 13, 1936, Serial No. 68,621

2 Claims. (Cl. 251—105)

This invention relates to gas cocks and has as a general object to provide a gas cock whereby the flow of gas to two burners may be controlled from a single valve.

Another object of this invention is to provide a gas cock of the character described whereby the flow of gas to a simmering and an adjacent main burner may be controlled from a single valve in such a manner that the simmering burner may be lit without lighting the main burner, and whereby both burners may be operated at either full volume or reduced volume.

Another object of this invention is to provide a gas cock of the character described which by reason of its novel design involves but a few parts and is but slightly larger than the ordinary single burner cock.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a top view of a gas cock embodying this invention illustrating its application to a combined simmering and main burner;

Figure 2 is a cross section view taken through Figure 1 on the plane of the line 2—2;

Figure 3 is a perspective view of the body of the gas cock;

Figure 4 is a perspective view of the valve plug;

Figure 5 is a section view taken through Figure 2 on the plane of the line 5—5;

Figure 6 is a section view taken through Figure 2 on the plane of the line 6—6;

Figure 7 is a cross section view through Figure 5 on the plane of the line 7—7 showing the valve plug in its closed position; and Figures 8, 9 and 10 are views similar to Figure 7 showing the plug in different positions of adjustment.

Referring now particularly to the accompanying drawings in which like numerals indicate like parts throughout the several views, the numeral 4 designates the body of a gas cock which has a tapered bore 5 to receive a rotatable valve plug 6. Communicating with the bore 5 and extending outwardly through a threaded nipple 7 is an inlet port 8 through which gas from the supply pipe (not shown) into which the nipple 7 is threaded enters the bore 5 under the control of the valve plug 6.

Communicating with the bore 5 are two jets 9 and 10 which project into mixing chambers 11 and 12, respectively. These mixing chambers 11 and 12 may be integrally joined to the combination burner, indicated generally by the numeral 13, by a tubular stem 14. The stem 14 is divided by a partition 15 into two passages, one of which leads from the mixing chamber 11 to the simmering burner 16 and the other of which communicates the mixing chamber 12 with the main burner 17.

On a plane transverse to the axis of the bore 5 and passing through the inlet port 8, the valve body is substantially Y-shaped, the stem of the Y being the threaded nipple 7 and the arms 18 and 19 thereof having the jets 9 and 10 mounted thereon. These arm portions 18 and 19 have longitudinal bores 20 and 21 parallel to the axis of the tapered bore 5 and communicating with the jets 9 and 10.

The bore 20 in the arm 18 which mounts the jet 9 communicates with the innermost end of the tapered bore 5 through a small diameter cross bore 22, while the bore 21 of the other arm 19 which mounts the jet 10 supplying gas to the main burner is communicated with the tapered bore 5 through a large diameter radial bore 23 whose axis lies on the transverse plane passing through the inlet port 8.

The rotatable valve plug 6 has a longitudinal bore 24 opening to its inner end and extending outwardly beyond the plane of the inlet port 8 and the radial bore 23 at which point the plug has opposite radial openings 25 and 26 communicating with its longitudinal bore 24. These openings 25 and 26 have main passages disposed at an obtuse angle to each other and of a size substantially the same as that of the inlet port 8.

The mouth of the opening 25 is circumferentially enlarged by a shallow recess 27 in the surface of the plug and disposed counter-clockwise from the main passage when viewed from the outer end of the plug, as in Figures 7 to 10, inclusive. The circumferential enlargement of the mouth of the opening 25 provided in this manner enables at least a partial communication between the opening 25 and the inlet port 8 even after the plug has been turned to a position at which the main passage of the opening 25 is disaligned from the inlet port.

The opening 26 is likewise provided with a circumferentially enlarged mouth through the provision of two angular cuts 28 in its sides to allow at least partial communication with the inlet port 8 through a substantial degree of rotation of the plug.

The rotation of the plug is confined to approximately one hundred and eighty degrees by the engagement of a pin 29 projecting radially from a reduced neck 30 on the plug with stops 31 and 32. The stop 31 is fixed and is provided by one edge of a segmental extension 33 projecting from the outer plane 34 of the valve body. When the pin 29 is engaged with this stop 31, the plug is in its closed position of rotation, shown in Figure 7, at which the solid cylindrical wall of the plug covers the inlet port 8.

The other stop 32 is adjustable and is provided by a screw 35 threaded in an ear or lug 36 projecting from the face 34 of the valve body. When the pin 29 is engaged with the end of the screw 35, the plug is in its position of rotation shown in Figure 10 at which both the simmering and the main burners are being supplied with fuel, but at a reduced rate.

The plug also has two intermediate positions of adjustment depicted in Figures 8 and 9, and these are indicated or determined by a spring detent comprising a spring pressed ball 37 projecting from the neck 30 for engagement in radial slots or notches 38 and 39 opening to the mouth of the bore 5. When the spring ball 37 is engaged in the notch 38, the plug is held in its position of rotation depicted in Figure 8. In this position only the simmering burner is being supplied with gas as the radial bore 23 leading to the jet 10 is closed by the cylindrical surface of the plug. The flow of the gas from the inlet port 8 to the simmering burner jet 9 is through the opening 26 into the longitudinal bore 24 of the plug and then from the inner end of the tapered bore 5 through the cross bore 22 into the bore 20 which leads to the jet 9. It is to be observed that in this position of adjustment, the communication between the opening 26 and the inlet port 8 is through one of its inclined side slots 28.

When the spring ball 37 engages in the other radial slot or notch 39, the plug is held in its position of rotation depicted in Figure 9. In this position, both the simmering burner and the main burner are supplied with the maximum volume of fuel as the main passage of the opening 26 is directly in line with the inlet port and the main passage of the opening 25 is in line with the radial bore 23 leading to the bore 21 with which the jet 10 communicates.

In the last position of adjustment, which is the position of the plug defined by the engagement of the pin 29 with the adjustable stop 32, both burners are supplied with gas but at a reduced rate. To this effect the communication between the opening 26 of the plug and the inlet port 8 is restricted as the main passage of the opening 26 is disaligned from the port 8 and the communication between the opening 25 and the radial bore 23 is restricted being afforded merely by the shallow recess 27 which communicates with the opening 25.

Inasmuch as the stop 32 is readily adjustable, the reduction in fuel feed effected by turning the plug to its position depicted by the stop 32 may be set to different amounts.

The rotatable plug 6 is held seated in the bore 5 by an expansive spring 40 mounted on the stem 41 of the plug and confined between the shoulder formed at the juncture of the stem 41 and the neck 30 and the bottom of a cup member 42 secured to the outer face 34 of the valve body. The cup member is conveniently and detachably secured in position by screws 43.

The stem 41 projects out through the bottom wall of the cup member and has an actuating handle 45 detachably mounted thereto by which the plug may be turned.

From the foregoing description taken in connection with the accompanying drawings, it will be readily apparent to those skilled in the art to which this invention appertains, that this invention provides a gas cock for the combined control of a simmering and main burner which involves but a few simple parts easily assembled, and that it affords a particularly convenient and desirable sequence of control by supplying fuel first to the simmering burner, then at full volume to both the simmering and the main burners, and lastly, at reduced volume to both the simmering and main burners.

What I claim as my invention is:

1. A gas cock for controlling the flow of gas to a simmering burner and a main burner, comprising a valve body having a substantially Y-shaped cross section on a transverse plane and having a tapered bore to receive a valve plug arranged with its axis normal to said transverse plane and located at the juncture of the arms and the leg of the Y, the leg of the Y having an inlet port therethrough communicating with the bore, the axis of which lies on said transverse plane, and said valve body also having two parallel spaced outlet ports in the arms of said Y with their axes parallel to the axis of the tapered bore and lying on a plane normal to the axis of the inlet port, said outlet ports being communicated with said tapered bore, one of said outlet ports being for the simmering burner and the other being for the main burner, and a rotatable valve plug seated in said bore, said plug having open passages communicable with the ports and so disposed with respect to the locations of the points of communication of the ports with the bore that upon continued rotation of the plug in one direction and from a predetermined closed position first the simmering burner is supplied with fuel, next both the simmering and the main burners are supplied with the full volume of fuel, and next both the simmering and main burners are supplied with a reduced volume of fuel.

2. A gas cock of the character described, comprising a valve body having a substantially Y-shaped cross section on a transverse plane and having a tapered bore to receive a valve plug disposed with its axis normal to said transverse plane, said body also having an inlet port through the leg and outlet ports in the arms of the Y arranged with their axes in parallel spaced relationship parallel to the axis of the bore and lying in a plane normal to the axis of the inlet port, one of said outlet ports being adapted to supply fuel for a simmering burner and the other to an adjacent main burner, the body having a passage communicating the outlet port for the simmering burner with the inner end of the tapered bore and having another passage leading from the outlet port for the main burner to the tapered bore with a branch thereof opening to the tapered bore on a transverse plane coinciding with the axis of the inlet port, the axes of said branch and the inlet port being disposed at an obtuse angle to each other, a valve plug rotatable in said bore and having two radial meeting bores in transverse alignment with the inlet port and said branch and disposed at an obtuse angle equal to the angular disposition of said branch and the inlet port so that direct and full communication may be established therebetween with the plug in one position of rotation, said plug having also a longitudinal bore extending from the intersection of its two radial bores to the inner end of the tapered bore to provide communication to the outlet bore for the simmering burner as long as the plug is in a position of rotation maintaining communication between the inlet bore and one of said radial bores, and said plug having circumferential enlargements at the mouths of the radial bores so that upon continuous rotation of the plug in one direction from a closed position communication is first established between the inlet port and the outlet port for the simmering burner, next full communication is provided between the inlet port and both of the outlet ports and next restricted communication is provided between the inlet port and both outlet ports.

ELMER G. STEFFEN.